United States Patent Office 3,832,363
Patented Aug. 27, 1974

3,832,363
METHOD OF EPOXIDIZING OLEFINIC COMPOUNDS USING AN OXYBORON CATALYST
Lloyd C. Fetterly and George W. Conklin, Oakland, and Nathan C. May, Berkeley, Calif., assignors to Shell Oil Company, New York, N.Y.
No Drawing. Filed Sept. 7, 1965, Ser. No. 485,563
Int. Cl. C07d 1/08
U.S. Cl. 260—348.5 V 6 Claims

ABSTRACT OF THE DISCLOSURE

Ethylenic compounds are epoxidized to corresponding oxirane compounds by reaction with an organic hydroperoxide, especially one containing only C, H, and O atoms, e.g., tertiary butyl hydroperoxide, in the presence of a boron oxide, a dehydrated boric acid and the hydrocarbyl esters thereof, especially a trialkoxyboroxine. Boron oxide or dehydrated boric acid in the reaction mixture reacts with alcohols formed in the process to provide alkyl borate esters in the reaction mixture. The hydroperoxide can be provided by an in situ reaction of molecular oxygen with saturated aliphatic, acyclic and alicyclic, including aryl-substituted aliphatic compounds, such as a paraffin hydrocarbon, which react with oxygen to form a hydroperoxide in the presence of the ethylenic compound.

---

This invention relates to an improved process for the production of oxiranes, and more particularly to the liquid phase epoxidation of olefinic compounds to the corresponding oxirane compounds.

A large variety of olefin oxides has been produced commercially and many others experimentally. The simplest one, ethylene oxide, is prepared on a large commercial scale by the controlled catalytic vapor phase reaction of ethylene and oxygen. However, no satisfactory process has been developed for the vapor-phase reaction of other olefins with oxygen to yield corresponding olefin oxides. Propylene oxide, for example, is produced commercially only by dehydrochlorination of propylene chlorohydrin. Various methods have been proposed for the reaction of molecular oxygen with propylene to produce propylene oxide, both catalytic (see, for example, Haruo Shingu, U.S. 2,985,668, May 23, 1961) and non-catalytic (see, for example, Dexter B. Sharp et al., U.S. 3,153,058, Oct. 13, 1964) but none has proven to be commercially feasible.

Oxirane compounds including hydrocarbons and non-hydrocarbons, have been produced by epoxidation of ethylenic compounds with various peroxy compounds, such as peracetic acid and perbenzoic acid. The following are some exemplary epoxidations: vinylcyclohexene to the corresponding mono- and di-epoxides, aldrin to dieldrin, allyl chloride to epichlorohydrin, allyl alcohol to glycidol, acrolein to glycidaldehyde, bicyclo[2.2.1]hepta-2,5-diene to corresponding mono- and di-epoxides, methyl epoxy stearate from ethyl oleate, epoxy stearate from oleic acid, dicyclopentadiene to corresponding mono- and di-epoxides, butadiene to epoxybutene and styrene to styrene epoxide. Benjamin Phillips et al., U.S. 2,785,185, Mar. 12, 1957, disclose a large number of epoxidations using the reaction product of acetaldehyde and oxygen as epoxidizing agent.

It is a principal object of this invention to provide an improved process for the epoxidation of ethylenic compounds.

A more specific object is to provide an improved process for the liquid phase epoxidation of ethylenic compounds, and especially water-insoluble compounds, by contacting with oxygen under suitable conditions and in an environment which effects a good yield of corresponding oxirane compounds.

Now, in accordance with the present invention, it has been found that ethylenic compounds can be advantageously epoxidized to corresponding oxirane compounds by reaction with hydroperoxides in the presence of a boron oxide, a dehydrated boric acid—especially metaboric acid in the boroxine form alone or containing other hydroxyboron compounds comprising at least one B-O-B linkage— and the hydrocarbyl esters thereof, particularly alkyl esters. A preferred group of alkyl esters consists of the trialkoxyboroxines.

In general, the process involves reaction of a compound having carbon-to-carbon unsaturation with a hydroperoxide under substantially nonhydrolytic conditions and in the presence of a boron oxide, dehydrated boric acid or ester thereof under conditions such that the boron compound tends to bring about decomposition of the hydroperoxide. The ethylenic compound is epoxidized to the corresponding oxirane compound and the hydroperoxide to corresponding hydroxyl compound: at least a portion of the latter, if an alcohol, will form a borate ester with boric oxide or dehydrated boric acid or with any hydroxy-boron compound contained therein, e.g. alkoxyboroxines, or with full borate ester by ester exchange, e.g. trialkoxyboroxines.

The process may be visualized as one in which a boric oxide, dehydrated boric acid or ester thereof is contacted with an organic hydroperoxide, preferably one containing only C, H, and O atoms, for example, a hydrocarbyl hydroperoxide such as the alkyl, cycloalkyl, aralkyl or alkenyl hydroperoxide, under conditions which normally result in an accelerated decomposition of the hydroperoxide to hydroxyl compound, in the presence of an ethylenic compound with the result that the peroxide oxygen epoxidizes the ethylene carbon-to-carbon group to an oxirane group. The organic hydroperoxide may contain additional functional groups such as hydroxy, hydrocarbyloxy, and carbonyl.

The manner in which the oxyboron compound effects the epoxidation of the olefinic compound by the hydroperoxide is largely a matter of conjecture, but observations on different combinations of reactants and conditions suggest that the hydroperoxide and oxyboron compound react to form a perborate ester intermediate which then reacts with the olefinic unsaturation to give the olefin epoxide and borate ester. Thus, tertiary butyl hydroperoxide may form a transitory tertiary butyl perborate or perboroxine with boric oxide or alkoxyboroxine, which then reacts with the olefin, for example 1-hexene to yield, 1,2-epoxyhexane and tertiary butyl borate or tertiary butoxyboroxine. It is appreciated that prior attempts to prepare and isolae perborate esters have met with apparent failure.

The process is advantageously carried out using a boroxine triester as the oxyboron compound. For example, tri-n-butoxy-boroxine and tri-sec-butoxyboroxine,

$(C_4H_9OBO)_3$, are particularly effective in that there is little or no induction period and they are soluble in the organic compounds. Other trialkoxyboroxines are useful, and in general, those containing from 1 to 10 carbon atoms in each alkoxy are useful.

In representative reactions with tert-butylhydroperoxide, various olefins were reacted under different conditions in the presence of the butoxyboroxine catalyst. 1-Dodecene yielded the terminal epoxide in over 80% selectivity at 100° C. This reaction proceeded even in the presence of various oxidation inhibitors which suggests that the perborate reaction step is polar and not ionic; without the boron compound the selectivity was very low (order of 5–10%).

The boron compound, in addition to providing an effective means for bringing about the epoxidation of the olefin compound by the hydroperoxide, also makes it possible to provide suitable hydroperoxides by an in situ reaction of molecular oxygen with saturated aliphatic, acyclic and alicyclic, including aryl-substituted aliphatic compounds—especially hydrocarbons with an alkane moiety which reacts with oxygen to form a hydroperoxide—in the presence of the ethylenic compound. Hence a preferred embodiment of the invention comprises intimately contacting a mixture of an ethylenic compound, especially a nonconjugated olefinic hydrocarbon, and a saturated compound, especially a hydrocarbon or alcohol having an alkane moiety which reacts with oxygen to form a hydroperoxide, in liquid phase, and containing a boroxine triester usually a trihydrocarbyloxyboroxine, for example, tri-n-butoxyboroxine, dissolved therein, with molecular oxygen, usually at about 3–20% volume concentration in an inert gas, e.g. nitrogen, at a suitable somewhat elevated temperature, say from 100° to 200° C., with the formation largely of secondary alcohols of the saturated reactant and/or borate esters thereof and of epoxide of the ethylenic compound.

As an illustrative example of a preferred embodiment of the invention, oxidation of a 10% weight solution of 1-dodecene in n-hexadecane (cetane) at 180° C. and atmospheric pressure for three hours, in the presence of tributoxyboroxine, $(n-C_4H_9OBO)_3$, in an amount equivalent to 0.025 gram atom of boron per hundred grams of hydrocarbon charged, using 350 cc./min. of an equal volume mixture of air and nitrogen per 100 grams of hydrocarbon gave principally dodecane-1,2-epoxide in about 62% selectivity at a 74% olefin conversion level. Alcohols were co-products in the reaction; they were almost all secondary cetyl alcohols.

An inexpensive reactive diluent such as a hydrocarbon having an alkane moiety, which is capable of generation of the hydroperoxide instead of the olefin, which undiluted olefin would be consumed in part to form unsaturated alcohol, is necessary for the maximum selectivity to the epoxide product. A higher alkane diluent, such as n-dodecane or n-hexadecane, oxidizes at 180° C. with the same high selectivity to secondary alcohols, instead of to ketones and other oxygenated products, in the presence of the olefin and the boron compound, as it does in the absence of the olefin but in the presence of the boron compound. The rate of epoxidation of the olefin by the formed hydroperoxide is usually about four to five times that of the paraffin. This makes it possible for the olefin conversion to epoxide to proceed to a very high level by high dilution with paraffin. Suitable hydrocarbons with an alkane moiety which reacts with oxygen to form a hydroperoxide are those of from 3 to 40 carbon atoms, it being appreciated that those of higher molecular weight, although solids at room temperature, will be liquid at the temperatures of operation of the process. A preferred group of alkanes includes those of from 5 to 30 carbon atoms. Representative alkanes included propane, butane, pentane, 2,2,5-trimethylhexane, 2-ethylhexane, nonane, 1-methylheptadecane, eicosane, hexacosane, triacontane, squalane, hexatriacontane, tetracontane, polyethylene, and the like. The diluent may also be a nonhydrocarbon containing an alkane moiety which reacts with oxygen to form a hydroperoxide. Exemplary of such nonhydrocarbons are certain alcohols, such as lauryl alcohol, stearyl alcohol, and the like, and ether, such as methyl lauryl ether, propyl cetyl ether, and the like.

A factor contributing to low epoxide selectivity in the absence of the reactive diluent is the decomposition of the epoxide to side products, usually much higher boiling. It has been found that the very active boroxine catalyst $(ROBO)_3$ for the formation of the epoxide is also very active in catalyzing epoxide decomposition. Thus, during an oxidation of 1-dodecene in cetane at 180° C., a reduction in the catalyst concentration from 0.10 to 0.025 gram atom of boron per 100 grams of hydrocarbon resulted in an increase from about 15% selectivity to 64% selectivity at an olefin conversion level of 70%. At a 20% conversion level the reduced catalyst concentration permitted selectivities near 85%. The activity of boroxine esters for decomposing olefin epoxides is demonstrated even more clearly by the results from heating n-tetradecane-1,2-epoxide at about 150–180° C. (a) alone (no reaction after one hour), (b) with 0.10 gram atom of boron as tributyl borate per 100 grams of olefin oxide (essentially no reaction after one hour), and (c) with 0.10 gram atom of boron as tri-n-butoxyboroxine per 100 grams of olefin oxide (rapid and essentially complete decomposition).

Therefore, the reactive diluent serves at least two important functions: it provides the predominant proportion of C-to-H linkages for hydroperoxide formation thereby minimizing undesirable direct oxidation of olefin molecules to olefin hydroperoxides, which in turn may lead to olefinic alcohols and ketones; and it provides an effective means of reducing the deleterious action of the boron compound on the epoxide for which it is responsible. Consequently, it is important to provide the various reactants and catalyst within certain relative proportions in order to insure adequate control and direction of the various co-operating and antagonistic reactions. Sufficient boron compound should be provided to maximize conversion of the hydroperoxide to alcohol instead of to ketone (possible via a perborate ester intermediate)—about 0.025 gram atom of boron per 100 grams of hydrocarbon material to be oxidized gives good results in this regard, but from one-fourth to six times that amount can be used for that purpose; preferred is one-half to twice that amount. Internal olefins may accommodate an even higher concentration of boron. Also, sufficient boron compound should be used to insure optimum transfer of the "per"-oxygen of the hydroperoxide to the olefinic linkage to form epoxide. At the same time, the concentration of boron compound and its ratio to the epoxide should be sufficiently small to minimize decomposition thereby of the olefin epoxide—0.10 gram atom of boron as boroxine per 100 grams of olefin oxide can be used, especially when the olefin plus olefin oxide is at a concentration of about 10% by weight in saturated hydrocarbon and/or corresponding alcohol—considerable better results are obtained at corresponding concentrations from about one-tenth to about one-half, especially about one-fifth to one-third.

The process is advantageously carried out in the absence of any metals and/or metal ions, e.g. $Co^{++}$, $Mn^{++}$, and the like, which have a deleterious effect on the epoxide, probably catalyzing epoxide decomposition and thereby lowering epoxide selectivity.

Incremental addition of the boron catalyst and the use of lower temperatures gives improved results. It is of interest that whereas a temperature of about 180° C. is required for adequate reaction rate of paraffins such as cetane with oxygen in the presence of the boron compound, the rate of paraffin oxidation is equally fast at lower temperatures, e.g. 150° C., in the presence of the olefinic compound.

Oxidation of lower boiling olefins requires a pressure system; solution of lower olefins in higher paraffins, by virtue of the lower partial pressure of the olefin, can reduce somewhat the pressure requirements to maintain the olefin in a condensed state. As illustrative, a 40:60 molar ratio of 1-hexene in n-octane has given epoxide selectivities in the presence of tributoxyboroxine of about 40% at a 16% conversion level at 70 p.s.i.g. and 120° C. The use of 2,2,5-trimethylhexane as solvent provided more hydroperoxides and better selectivities.

The boron catalysts useful in the process of this invention include a boron oxide, such as $B_2O_3$, a dehydrated boric acid, and hydrocarbyl, especially alkyl, esters thereof. By the term "dehydrated boric acid" is meant to be included not only metaboric acid in the boroxine form but also boric acid itself used under dehydrating conditions, e.g. heating in hydrocarbon solvent at temperatures preferably below about 160° C. until the major portion of water is removed and then heating finally at above about 160° C. In the dehydration of boric acid the resulting product at completion is metaboric acid in the boroxine form but more often is a mixture of intermediate hydroxyboron compounds comprising one or more B-O-B linkages. Such a mixture, a "boron glass," including the alkyl esters thereof is useful in the process of the invention. It may also include diol and polyol boron esters containing one or more B-O-B linkages. The preparations of metaboric acid in the boroxine form and the hydrocarbyl esters thereof are well summarized in H. Steinberg, "Organoboro Chemistry," Vol. 1, 445–454, Interscience Publishers (Wiley), New York, 1964.

The process of this invention is generally applicable to the epoxidation of any aliphatic or cycloaliphatic compound having at least one aliphatic carbon-to-carbon unsaturation, especially an ethylenic carbon-to-carbon bond. Thus, it is applied to the epoxidation of olefins having, for example, from 3 to 30 carbon atoms. The invention is used to advantage in the epoxidation of carbon-to-carbon ethylenically unsaturated linkages in hydrocarbons. Monoolefins such as propylene, butylene, cyclohexene, 1-octene, dodecene, cyclododecene, 1-octadecene, 1-eicosene, 1-hexacosene, and 1-triacontene are a few examples of suitable hydrocarbons. Suitable hydrocarbons include both branched- and straight-chain, as well as cyclic, compounds having one or more of these ethylenic or olefinic sites. These sites may be conjugated, as in 1,3-butadiene, but preferably nonconjugated, as in 1,5-hexadiene and bicyclo-[2.2.1]-hepta-2,5-diene. In the case of polyolefins, it is possible to epoxidize only one of the olefinic sites or several or all of these sites. Suitable polyolefinic compounds include polybutadiene, polyisoprene, 1,5-cyclo-octadiene, dipentene, carotene, squalene, methyl abietate, and the like. The unsaturated carbon-to-carbon olefinic linkage may be between terminal and their adjacent carbon atoms, as in 1-pentene, or between internal chain carbon atoms, as in 4-octene. The process may also be used to epoxidize ethylenic carbon-to-carbon linkages of nonhydrocarbons, e.g. olefinically unsaturated alcohols, such as oleyl alcohol, abietyl alcohol, cholesterol, tetrahydrobenzyl alcohol, and the like; and olefinically unsaturated esters, such as methyl oleate, butyl acrylate, 2-ethylhexyl methacrylate, and the like.

A particularly valuable aspect of the invention resides in its ability to effect the epoxidation of terminal olefins, i.e. alpha-olefins, as well as internal olefins. Olefinic hydrocarbon fractions, such as, for example, polymeric olefinic fractions, cracked wax fractions, and the like, containing terminal olefins along with substantial proportions of internal olefins are readily epoxidized. Such suitable feeds consisting of olefinic hydrocarbon fractions include, for example, $C_7$, $C_8$, $C_9$, $C_{10}$ and higher olefinic hydrocarbon fractions as well as olefinic hydrocarbon fractions of wider boiling ranges such as $C_{7-9}$, $C_{10-13}$, $C_{14-17}$ olefinic hydrocarbon fractions and the like.

The olefinic charge may comprise two or more of the above-defined suitable olefins. Olefinic hydrocarbon fractions are epoxidized under the conditions above-defined to mixtures containing the desirable epoxide product. The reaction mixtures obtained may be subjected to suitable catalyst and product separating means comprising one or more such steps, for example, as stratification, solvent extraction, distillation, fractionation, adsorption, etc. Catalyst, as well as unconverted charge, may be recycled in part or entirely to the reaction zone.

The following examples are illustrative of the process of this invention. It is to be understood that these examples are given only for illustration and are not to be construed as limiting the invention to the details thereof.

EXAMPLES 1–3

The general procedure used in Examples 1–3 is given hereinbelow followed by tabulation in Table 1 of the individual reaction conditions and results.

A mixture of olefin and alkane of desired composition together with $B_2O_3$ was charged to a stainless-steel reactor of internal measurement of 2¼ x 8 inches. The reactor was heated with an electrical resistance heating jacket. A mixture of oxygen and nitrogen from a premixed source was fed to the reactor through a line leading to the bottom of the reactor, the gas being dispensed into the liquid reaction medium through a sintered-glass dispenser. The boron oxide was kept in suspension by use of a magnetic-stirring device operating a Teflon-covered stirring bar. Effluent from the reaction was conducted from the top of the reactor through a steam-jacketed transfer line to a water-cooled (20° C.) condenser. Gas and uncondensed vapors from that condenser were led for further condensation to a second condenser cooled to —60° C. The combined condensates were collected in a phase separator constructed from Jerguson gage glass permitting visual observations of accumulated water. Upper phase liquid was permitted to drain back continuously to the reactor, while the water layer was removed intermittently through a drain valve. Uncondensed gas exiting from the second condenser was passed through a Grove back-pressure regulator to an atmospheric pressure gas measuring and sampling system. A slip stream from this atmospheric pressure gas system was continuously directed through a Beckman oxygen analyzer to moniter the oxygen content.

EXAMPLES 4–7

The reactions, tabulated in Table 2, were carried out in a flat-bottomed glass tube 2 inches in diameter and 18 inches high. The tube was equipped with a removable cap to which was attached a thermometer and oxidant feed and vent tubes. Oxidant was introduced down the feed tube through a "C" Pyrex, sintered-glass thimble 1 cm. in diameter near the bottom of the reactor. The oxidant feed was prepared from air and nitrogen metered from calibrated rotameters.

The reactor contents were stirred with a magnetic stirrer using a Teflon-coated steel bar. The lower 3 inches of the reactor was heated with a Glas-Col mantle. The upper portion of the reactor was left uninsulated to act as a vent-gas cooler. The total amount of hydrocarbon charged was usually 85 grams, but 100 grams or 170 grams was occasionally used.

Epoxide content of the product solution was determined by titration with a standardized solution of HBr in acetic acid. The unreacted olefin content was determined by gas

TABLE 1.—EPOXIDATION OF ALPHA-ALKENE IN THE PRESENCE OF ALKANE

| Example | 1 | 2 | 3 |
|---|---|---|---|
| Alpha-alkene, g | 1-hexene, 101.5 | 1-hexene, 100.5 | 1-butene, 52.0 |
| Alkane, g | 2,2,5-trimethylhexane, 151.0 | 2,2,5-trimethylhexane, 150.5 | Isooctane, 200.0 |
| Oxyboron catalyst, g | $B_2O_3$, 1.0 | $B_2O_3$, 1.0 | $B_2O_3$, 1.25 |
| Gram atom of boron per 100 grams of total hydrocarbon (alkene + alkane) | 0.11 | 0.11 | 0.14 |
| Oxidant, mole percent $O_2$ in $O_2$-$N_2$ mixture | 10 | 10 | 10 |
| Oxidant rate, moles/hr. (1 atm, 0° C.) | 2.35 | 2.45 | 2.58 |
| Pressure, p.s.i.g | 71–73 | 60–71 | 325 |
| Time, hr | 6 | 4.25 | 4.5 |
| Temperature, °C | 122–139 | 117–137 | 123–137 |
| $O_2$ consumed, mole | 0.584 | | 0.344 |
| Conversion of olefin, percent | 29 | 18 | 37 |
| Epoxide, selectivity, percent | 1,2-epoxyhexane, 53 | 1,2-epoxyhexane, 60 | 1,2-epoxybutane, 23 | chromatography. The total amount of olefin converted was taken as the difference between the amount of charged olefin and the amount of unreacted olefin. The selectivity to epoxide was the amount of olefin converted to epoxide expressed as a percent of the total amount of olefin converted.

rial present and the organic material present is composed of from about 3 to about 40% by weight of said ethylenic compound and from about 60 to about 97% by weight of said saturated aliphatic hydrocarbon and resultant reaction products thereof.

2. The process according to claim 1 wherein said oxyboron catalyst is boron oxide.

3. The process according to claim 1 wherein said oxyboron catalyst is trialkoxyboroxine containing from 1 to 10 carbon atoms in each alkoxy group.

4. The process according to claim 3 wherein said trialkoxyboroxine is tri-n-butoxyboroxine.

5. The process in accordance with claim 1 of producing 1,2-epoxyalkane wherein the ethylenic compound is alpha-alkene.

6. The process according to claim 5 wherein said 1,2-epoxyalkane is propylene oxide, said alpha-alkene is propylene, the organic hydroperoxide is formed in situ by reacting the oxygen-containing gas with an added saturated aliphatic, acyclic or cyclic, hydrocarbon of from 5 to 30 carbon atoms, and the oxyboron catalyst is tri-n-butoxyboroxine.

TABLE 2

| Example | 4 | 5 | 6 | 7 |
|---|---|---|---|---|
| Alkene, percent wt. of hydrocarbon charge | Alpha-dodecene, 10 | Alpha-dodecene, 10 | Mixed n-$C_{12}$ alkenes, 25 | Mixed n-$C_{14}$ alkenes, 25 |
| Alkane, percent wt. of hydrocarbon charge | Cetane, 90 | Cetane, 90 | Cetane, 75 | n-Dodecane, 75 |
| Oxyboron catalyst, g.-atoms per 100 g. of hydrocarbon | Boron oxide, 0.09 | Tributoxyboroxine, 0.025 | Boron oxide, 0.10 | Boron oxide, 0.10 |
| Oxidant, mole percent $O_2$ in $O_2$-$N_2$ mixture | 10 | 10 | 10 | 10 |
| Oxidant rate, cc./min. per 100 grams hydrocarbon charged | 420 | 330 | 500 | 490 |
| Temperature, °C | 180 | 180 | 180 | 180 |
| Time, minutes | 45 | 135 | 90 | 90 |
| Olefin conversion, percent | 27 | 60 | 32 | 35 |
| Selectivity to epoxide, percent | 85 | 69 | 70 | 65 |

EXAMPLE 8

A pressure-tight, stainless-steel reactor was charged with 200 grams of cyclohexane and 7.2 grams of tributoxyboroxine. Propylene was introduced to maintain a pressure of 142 p.s.i.g. while the reactor was heated to 168° C. A gaseous mixture of 10 mole percent oxygen in propylene was introduced to the reactor at a rate of 365 cc./min. through a sintered-glass thimble placed near the bottom of the reactor. Effluent gas from the reaction zone was cooled and withdrawn from the reactor to maintain the desired pressure. Gas liquid chromatographic (GLC) analysis indicated a substantial amount of propylene oxide in the effluent gas stream. After the reaction was terminated, the liquid residue in the reactor was hydrolyzed to free cyclohexanol from the mixture of its boron esters. Cyclohexanol was present in an amount approximately equimolecular to the propylene oxide.

The experiment was repeated utilizing n-dodecane in place of cyclohexane as the component containing an alkane moiety and similar results were obtained.

We claim as our invention:

1. The process of epoxidizing ethylenic compounds by contacting in the liquid phase an ethylenic compound with an organic hydroperoxide containing only C, H, and O atoms, wherein said organic hydroperoxide is obtained in situ by reacting an oxygen-containing gas of about 3 to about 20% by volume of molecular oxygen in an inert gas with a saturated aliphatic, acyclic or cyclic, hydrocarbon of 3 to 40 carbon atoms which forms a hydroperoxide with oxygen, at a temperature of from about 100 to about 200° C. in the presence of an oxyboron compound as catalyst, selected from the group consisting of a boron oxide and alkyl esters of a dehydrated boric acid, present in an amount of from about 0.006 to about 0.15 gram-atom of boron per 100 grams of organic mate-

References Cited

UNITED STATES PATENTS

| 3,210,381 | 10/1965 | Gash | 260—348.5 |
| 3,242,157 | 3/1966 | Linder | 260—348.5 |
| 3,708,506 | 1/1973 | Brunie et al. | 260—348.5 L |

FOREIGN PATENTS

| 698,123 | 11/1964 | Canada | 260—462 |

OTHER REFERENCES

Davies: Organic Peroxides (1961), p. 11.

NORMA S. MILESTONE, Primary Examiner

S. D. WINTERS, Assistant Examiner

U.S. Cl. X.R.

260—348.5 L, 462 R